United States Patent [19]

Hayakawa

[11] 4,442,729

[45] Apr. 17, 1984

[54] LUBRICATING SYSTEM FOR FOUR-WHEEL DRIVE TORQUE TRANSFER MECHANISM

[75] Inventor: Yoichi Hayakawa, Toyoake, Japan

[73] Assignee: Aisin Warner Kabushiki Kaisha, Aichi, Japan

[21] Appl. No.: 309,141

[22] Filed: Oct. 6, 1981

[30] Foreign Application Priority Data

Oct. 7, 1980 [JP] Japan ............... 55-140022

[51] Int. Cl.³ ............ F16H 1/44; F16H 57/04
[52] U.S. Cl. ............... 74/467; 184/6.12
[58] Field of Search ............ 74/467; 184/6.12

[56] References Cited

U.S. PATENT DOCUMENTS

| | | | |
|---|---|---|---|
| 2,984,122 | 5/1961 | Woolley | 74/467 |
| 4,222,289 | 9/1980 | Watanabe et al. | 74/740 |
| 4,274,303 | 6/1981 | Shindo et al. | 74/740 |
| 4,367,661 | 1/1983 | Moroto et al. | 74/606 R |
| 4,368,802 | 1/1983 | Grabill et al. | 74/467 |

Primary Examiner—Lawrence J. Staab
Assistant Examiner—Michael D. Bednarek
Attorney, Agent, or Firm—Blum, Kaplan, Friedman, Silberman and Beran

[57] ABSTRACT

Pressurized lubricant from a vehicle transmission is inputted to a lubrication system of a four-wheel drive torque transfer mechanism through a cental oil passage in the transmission's output shaft. The transmission shaft coaxially joins with a shaft of the four-wheel drive torque transfer mechanism, said shaft also having a central oil passage. Lubricant leaves the central passage of the torque transfer mechanism shaft through radial oil passages to lubricate bearings and friction surfaces. Pump or splash lubrication is not used in the lubrication system for the four-wheel drive torque transfer mechanism.

13 Claims, 2 Drawing Figures

LUBRICATING SYSTEM FOR FOUR-WHEEL DRIVE TORQUE TRANSFER MECHANISM

BACKGROUND OF THE INVENTION

This invention relates generally to a four-wheel drive torque transfer mechanism applied to vehicles equipped with an automatic transmission and more particularly to a lubricating system for a four-wheel drive torque transfer mechanism. Conventional four-wheel drive torque transfer mechanisms are lubricated by an oil pump especially provided for the four-wheel drive torque transfer mechanism. Also, splash lubrication using a gear wheel, or chain splashing the oil contained in the transfer casing, are also used. The gear wheel or chain is a part of the power transmitting means between the front wheel driving output shaft and the rear wheel driving output shaft.

Provision of a lubrication oil pump for the torque transfer mechanism raises the cost of the device, requires a more complex construction and also reduces the efficiency of the transfer device. The result is increased fuel consumption by the engine.

Splash lubrication by means of a gear wheel or chain is not capable of reliable lubrication and seizure or wearing of the bearings is liable to occur.

What is needed is a simple and reliable lubricating system for a four-wheel drive torque transfer mechanism.

SUMMARY OF THE INVENTION

Generally speaking, in accordance with the invention, a lubricating system for a four-wheel drive torque transfer mechanism especially suitable for a high efficiency engine is provided.

Pressurized lubricant from a vehicle transmission is inputted to a lubrication system of a four-wheel drive torque transfer mechanism through a central oil passage in the transmission's output shaft. The transmission shaft coaxially joins with a shaft of the four-wheel drive torque transfer mechanism, said shaft also having a central oil passage. Lubricant leaves the central passage of the torque transfer mechanism shaft through radial oil passages to lubricate bearings and friction surfaces. Pump or splash lubrication is not used in the lubrication system for the four-wheel drive torque transfer mechanism.

Accordingly, it is an object of this invention to provide an improved lubricating system for a four-wheel drive torque transfer mechanism which provides effective lubrication without using a lubricating pump.

Another object of this invention is to provide an improved lubricating system for a four-wheel drive torque transfer mechanism which increases the fuel efficiency of the engine driving the four-wheel drive torque transfer mechanism.

A further object of this invention is to provide an improved lubricating system for a four-wheel drive torque transfer mechanism, which distributes oil wherever needed in the torque transfer mechanism operating on pressure supplied by the engine transmission.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
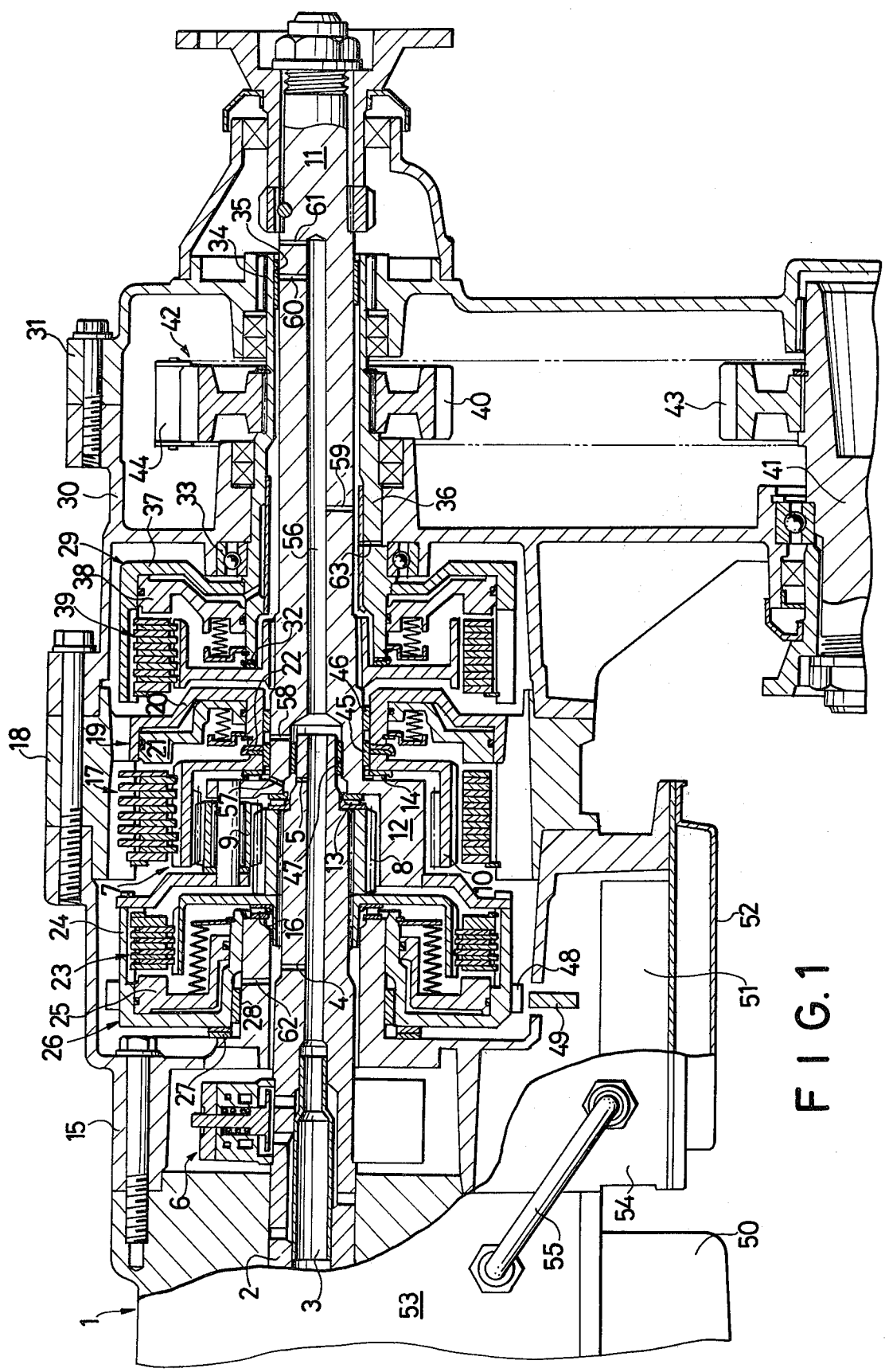
FIG. 1 is a sectional view of a torque transfer mechanism having a lubricating system in accordance with the invention.

A four-wheel drive torque transfer mechanism in accordance with the invention is described hereinafter with reference to the drawings. FIG. 1 shows a transmission gear unit 1 of an automatic transmission and a four-wheel drive torque transfer mechanism in accordance with the invention. An output shaft 2 of the automatic transmission 1 serves as the input shaft 2 to the torque transfer mechanism. An oil passage 3 for introducing lubricating oil into the mechanism extends through the shaft 2 along the central axis thereof. Radial oil passages 4,5 connect to the central oil passage 3 at preselected positions. A governor valve 6 is fixed to the input shaft 2.

A planetary gear train 7 comprises a sun gear 8 fitted onto the input shaft 2 by means of splines. The planetary gear train 7 also includes pinions 9 engaged with the sun gear 8, a ring gear 10 engaged with the pinions 9 and a carrier 12 rotatably supporting the pinion 9 thereon. The carrier is connected to a first output shaft 11 of the torque transfer mechanism.

A thrust bearing 13 is interposed between the sun gear 8 and the carrier 12 to accommodate the relative rotation between the sun gear 8 and the carrier 12. A thrust bearing 14 is interposed between the carrier 12 and the ring gear 10 to accommodate the relative rotation between the carrier 12 and the ring gear 10. A thrust bearing 16 is disposed between the sun gear 8 and the casing 15 of the torque transfer mechanism.

A friction brake device 17 selectively fixes the ring gear 10 to a casing 18 of the torque transfer mechanism. A hydraulic servo motor 19 comprises a cylinder 20 formed within the casing 18 of the torque transfer mechanism, and a piston 21 which is fitted in the cylinder 20, is adapted to operate the friction break device 17. A thrust washer 22 is interposed between the cyinder 20 and the ring gear 10. A friction clutch device 23 is operated by a hydraulic servo motor 26 comprising a cylinder 24 joined to the carrier 12 and a piston 25 fitted in the cylinder 24. The friction clutch 23 engages the sun gear 8 and the carrier 12, each being disposed on the side of the planetary gear train 7 adjacent to the transmission gear unit 1.

A thrust washer 27 and a bushing 28 are interposed between the cylinder 24 and the casing 15 of the torque transfer mechanism.

A hydraulic servo motor 29 comprises a cylinder 37 welded to a sleeve 36 which is rotatably supported within casings 30,31 of the torque transfer mechanism by means of a thrust washer 32, a ball bearing 33, a bearing 34 and bushing 35, and a piston 38 fitted in the cylinder 37.

A friction clutch device 39 connects the first output shaft 11, which as previously stated is joined to the carrier 12 with a sleeve 36 which is joined to a sprocket 40 of a link mechanism for driving a second output shaft 41 of the torque transfer mechanism as described more fully hereinafter.

The link mechanism 42 comprises the sprocket 40 connected to the sleeve 36 by splines, a sprocket 43 connected to the second output shaft 41 by splines, and a chain 44 extended between the sprockets 40,43.

Bushings 45,46,47 are provided between the ring gear 10 and the first output shaft 11, the cylinder 20 and the first output shaft 11, and the input shaft 2 and the first output shaft 11, respectively.

A parking gear 48 is formed on the hydraulic cylinder 24 of the friction clutch device 23. When the automatic transmission is shifted to the parking position, a detent 49 engages with the parking gear 48 to fix the output shaft 11.

A hydraulic pressure controller 51 controls the supply and drainage of a pressurized fluid to and from the hydraulic servo motors 26,29,19 for operating the clutch devices 23,39 and the brake device 17, respectively in the four-wheel drive torque transfer mechanism. An oil pan 52 is provided for the hydraulic pressure controller 51. The automatic transmission 1 also includes an oil pan 50. The pressurized fluid is supplied from the oil pan 50 to the hydraulic servo motors 36,29,19 of the clutch devices 23,39 and the brake device 17, respectively, through the hydraulic pressure controller 51 by way of a pipe 55 connected to a casing 53 of the automatic transmission 1 on one end and to a casing 54 of the torque transfer mechanism at the other end.

Lubricating oil is pumped from the oil pan 50 of the automatic transmission 1, regulated to a predetermined pressure, and then introduced into the oil passages 3,56 formed in the respective central coaxial portions of the input shaft 2 and the first output shaft 11. The lubricating oil introduced into the oil passages 3,56 is distributed to the thrust bearings 16,13,14, thrust washers 27,22,32, bushings 28,45,46,35, bearing 34, ball bearing 33, the planetary gear train 7, friction brake device 17 and friction clutch devices 23,39. The oil is distributed through oil passages 4,5,57-61 and through an oil passage 62 provided for the casing 15 of the torque transfer mechanism. The oil is also distributed through an oil passage 63 provided for the sleeve 36. All of the oil passages communicate with the main oil passages 3,56, respectively in the shafts 2,11.

Figure 2:
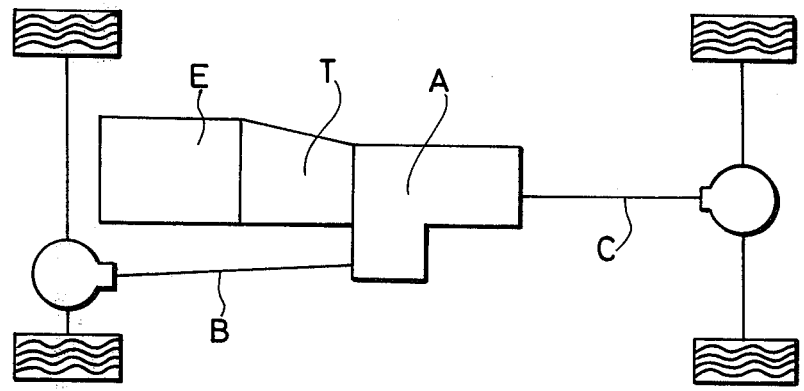
FIG. 2 is a schematic illustration of the power transmitting system of a vehicle using the torque transfer mechanism of FIG. 1.

As best seen in FIG. 2, the torque transfer mechanism A in accordance with the invention is connected to an automatic transmission T mounted on an engine E of a vehicle. The first output shaft 11 is joined to the rear propeller shaft C for driving the rear wheels, while the second output shaft 41 is joined to the front propeller shaft B for driving the front wheels. During ordinary running of the vehicle, line pressure is applied to the hydraulic servo motor 26 through the hydraulic control system (not shown) in the automatic transmission T to engage the clutch device 23. At the same time the hydraulic servo motors 19,29 are drained to release the clutch device 39 and the brake device 17, respectively. Consequently, the sun gear 8 and the carrier 12 of the planetary gear train 7 are coupled. Therefore, power is transmitted from the transmission shaft 2 to the rear wheel driving output shaft 11 at a reduction ratio of one to provide a rear wheel driving mode. Power of the input shaft 2 in the rear wheel driving mode is transmitted to the output shaft 11 by the carrier 12 through the medium of the clutch device 23, bypassing the gears 8,9,10. Therefore, no load is applied to the tooth surfaces of these gear 8,9,10 resulting in an increased life for the gearing.

When it is required to shift to a four-wheel driving mode during the rear-wheel driving mode, a leader or switch provided in the vicinity of the driver's seat is operated to actuate a fluid control valve (not shown) controlling the hydraulic servo mechanisms of the torque transfer mechanism, to thereby apply the line pressure gradually to the hydraulic servo motor 29. In this way the clutch device 39 is engaged smoothly and thereby the first output shaft 11 and the sleeve 36 are connected together to transmit power also to the front wheels via the linkage mechanism 42, the second output shaft 41 and the propeller shaft B. Thus, the four-wheel drive of the vehicle is effected wherein the power is transmitted from the shaft 2 to the front wheel driving output shaft 41 and to the rear wheel driving output shaft 11 at a reduction ratio of one.

When increased output torque is required during four-wheel drive operation, for example, for climbing up a steep slope, or a similar condition, the fluid control valve for controlling the hydraulic servo motors is operated to apply the line pressure gradually to the hydraulic servo motor 19. With appropriate timing, the hydraulic servo motor 26 is drained to engage the brake device 17 gradually, and to release the clutch device 23 smoothly. Consequently, the sun gear and the carrier 12 are disengaged and the ring gear 10 is fixed to the casing 18. Thereby, engine power is transmitted from the shaft 2 to the first and second output shafts 11, 41 at a higher reduction ratio via the sun gear 8, pinion 9 and the carrier 12. Thus, four-wheel drive operation is effected with a greater output torque and a reduced speed. The relationships between the respective conditions of the brake device 17 and clutch devices 23,39, and the operating modes of the vehicle are shown in Table 1.

TABLE 1

| Friction engagement elements → | 17 | 23 | 39 | Reduction ratio (examples) ↓ |
|---|---|---|---|---|
| Two-wheel drive running mode | X | O | X | 1 |
| Four-wheel direct drive running mode | X | O | O | 1 |
| Four-wheel drive reduced speed running mode | O | X | O | $\frac{1+\lambda}{\lambda} = 3.0$ |

In Table 1, the symbols O and X indicate the engaged and disengaged states, respectively, of the friction engagement elements. The value of $\lambda$ is the gear ratio between the sun gear 8 and the ring gear 10 of the planetary gear train 7. In the example shown in Table 1, when the gear ratio $\lambda$ is 0.5, then the reduction ratio of the operating mode of the four-wheel drive at reduced speed is 3.0.

In summary, in a lubricating system for a four-wheel drive torque transfer mechanism in accordance with the invention, lubricating oil contained in the transmission of the vehicle is introduced into an oil passage formed in one output shaft of a four-wheel drive torque transfer mechanism through an oil passage formed in the output shaft of the transmission. Then, the oil is distributed to bearings and other friction surfaces to lubricate them. Therefore, it is not necessary to provide an independent oil pump for the torque transfer device and the torque transfer device can be manufactured at a lower cost. Centrifugal force in the radial passages aids the outward flow of oil. Fuel consumption of the engine is improved and the torque transfer mechanism is simply constructed. Sufficient lubricating effect is provided to prevent seizure and unusual wear of the bearings and other parts.

It will thus be seen that the objects set forth above, among those made apparent from the preceding description are efficiently attained and, since certain changes may be made in the construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

What is claimed is:

1. In a torque transfer mechanism mounted as a separate unit on the rear end of a transmission disposed next to an engine of a vehicle, the improvement therein comprising:
    a common shaft functioning simultaneously as the output shaft of said transmission and the input shaft of said torque transfer mechanism;
    a first output shaft of said torque transfer mechanism, said common shaft and said first output shaft being supported rotatably and disposed coaxially with each other;
    a planetary gear train positioned between said common shaft and said first output shaft for selectively transmitting the rotational speed of said common shaft to said first output shaft with two different gear ratios, said gear train including a sun gear fitted onto said common shaft, pinions engaged with said sun gear, a ring gear engaged with said pinions and a carrier rotatably supporting said pinions thereon and connected to said first output shaft;
    a lubricating system including lubricating oil passages communicating with each other and formed along the central portions of said common shaft and said first output shaft of said torque transfer mechanism, pressurized lubricating oil contained within said transmission being introduced into said torque transfer mechanism through said lubricating oil passages to lubricate said torque transfer mechanism and said planetary gear train.

2. A torque transfer mechanism as claimed in claim 1, wherein one of the common shaft and the first output shaft of said torque transfer mechanism is provided with at least one through hole extending radially from said central portion thereof, lubricating oil passing through said at least one radial hole to said planetary train and friction parts requiring lubricant.

3. A torque transfer mechanism as claimed in claim 1, wherein the common shaft and the first output shaft of said torque transfer mechanism are each provided with at least one through hole extending radially from said central portion thereof, lubricating oil passing through said at least one radial hole to said planetary gear train and friction parts requiring lubricant.

4. A torque transfer mechanism as claimed in claim 3, and further comprising bearings, bushings and thrust washers, friction engagement elements disposed near said common shaft, and a casing on said torque transfer mechanism, said casing being disposed around said common shaft, said lubricating oil being supplied to said bearings, bushings and thrust washers via said at least one radial hole formed on said common shaft, said lubricating oil being suppllied to said radial holes formed in said casing, and to said planetary gear train and said friction engagement elements.

5. A torque transfer mechanism as claimed in claim 3, and further comprising a first bearing interposed between said sun gear and said first output shaft, a second bearing interposed between said ring gear and said carrier, and a junction rotatably joining said common shaft and said first output shaft, lubricating oil being supplied to the engaging parts of said planetary gear train, said first and second bearings and said junction via said radial holes formed in said common shaft.

6. A torque transfer mechanism as claimed in claim 5, and further comprising a cylinder and a bushing interposed between said carrier and said cylinder, said lubricating oil being further supplied to said friction engagement elements disposed around said shafts, to said bushing and to said cylinder via said junction and said radial holes formed in said shafts.

7. A torque transfer mechanism as claimed in claim 3, and further comprising a cylinder, sleeve, casing of said torque transfer mechanism and a first bearing interposed between said cylinder and sleeve, a second bearing interposed between said casing of said torque transfer mechanism and said sleeve, said lubricating oil being supplied via said radial holes, said sleeve being fitted on said first output shaft and including radial holes.

8. A torque transfer mechanism as claimed in claim 3, wherein the number of radial holes on said first output shaft is two, and further comprising a sleeve fitted on said first output shaft and a bushing interposed between said first output shaft and said sleeve, a case for said torque transfer mechanism and a bearing interposed between said sleeve and said case, said lubricating oil being supplied to said bushing via one of said radial holes and to said bearing via the other one of said two radial holes.

9. A torque transfer mechanism as claimed in claim 1, wherein said torque transfer mechanism provides driving outputs for a four-wheel drive vehicle.

10. A torque transfer mechanism as claimed in claim 4, wherein said torque transfer mechanism provides driving outputs for a four-wheel drive vehicle.

11. A torque transfer mechanism as claimed in claim 6, wherein said torque transfer mechanism provides driving outputs for a four-wheel drive vehicle.

12. A torque transfer mechanism as claimed in claim 7, wherein said torque transfer mechanism provides driving outputs for a four-wheel drive vehicle.

13. A torque transfer mechanism as claimed in claim 8, wherein said torque transfer mechanism provides driving outputs for a four-wheel drive vehicle.

* * * * *